(12) United States Patent
Inaba

(10) Patent No.: US 7,806,246 B2
(45) Date of Patent: Oct. 5, 2010

(54) LUBRICATING STRUCTURE OF ONE-WAY CLUTCH

(75) Inventor: Tetsuya Inaba, Fuji (JP)

(73) Assignee: JATCO Ltd (JP)

( * ) Notice: Subject to any disclaimer, the term of this patent is extended or adjusted under 35 U.S.C. 154(b) by 300 days.

(21) Appl. No.: 11/481,612

(22) Filed: Jul. 6, 2006

(65) Prior Publication Data

US 2007/0007098 A1 Jan. 11, 2007

(30) Foreign Application Priority Data

Jul. 7, 2005 (JP) .............................. 2005-199307

(51) Int. Cl.
*F16D 13/74* (2006.01)
*F16D 41/066* (2006.01)

(52) U.S. Cl. .................................. 192/113.32; 192/45

(58) Field of Classification Search ............ 192/113.32; 384/475, 472; 415/120; 416/60, 92, 93 R
See application file for complete search history.

(56) References Cited

U.S. PATENT DOCUMENTS

| 2,082,842 | A | * | 6/1937 | Marland | 192/45 |
| 2,403,579 | A | * | 7/1946 | Carpenter | 184/6.12 |
| 3,063,673 | A | * | 11/1962 | Johnson | 415/120 |
| 4,334,720 | A | * | 6/1982 | Signer | 384/475 |
| 4,473,144 | A | * | 9/1984 | Allori | 192/113.34 |
| 4,488,626 | A | * | 12/1984 | Handke | 192/70.12 |
| 5,183,139 | A | | 2/1993 | Malecha | |
| 5,687,826 | A | | 11/1997 | Kinoshita et al. | |
| 2005/0167227 | A1 | * | 8/2005 | Langston | 192/113.32 |

FOREIGN PATENT DOCUMENTS

| JP | 59-67664 U | 5/1984 |
| JP | 59-150027 U | 10/1984 |
| JP | 2-278061 A | 11/1990 |
| JP | 3-112141 U | 11/1991 |
| JP | 11-141555 A | 5/1999 |

OTHER PUBLICATIONS

Relevant Portion of European Search Report and opinion of European Application 06252958.1-1252 dated Nov. 11, 2006.
Office Action dated Mar. 3, 2009, issued in corresponding JP Application No. 2005-199307. English translation provided.

* cited by examiner

*Primary Examiner*—Rodney H Bonck
(74) *Attorney, Agent, or Firm*—Rossi, Kimms & McDowell LLP

(57) ABSTRACT

There is provided a lubricating structure of a one-way clutch which can lubricate rollers without degrading durability. A direction in which a lubricating oil passage for supplying oil to rollers of the one-way clutch extends is tilted relative to the rotational axis of an inner race and tilted relative to respective rotational axes of the rollers as viewed from the outer circumferential side of the inner race. Thus, a thin-walled part formed between the lubricating oil passage formed just below the roller and the surface on which the rollers roll can be reduced in size. As a result, when the inner race and the outer race are locked, roller's stress is less prone to be concentrated around the thin-walled part, and the deformation of the thin-walled part can be prevented, and therefore the degradation of the durability of the one-way clutch can be prevented.

1 Claim, 8 Drawing Sheets

LUBRICATING STRUCTURE OF ONE-WAY CLUTCH

BACKGROUND OF THE INVENTION

1. Field of the Invention

The present invention relates to the lubricating structure of a one-way clutch disposed in an automatic transmission.

2. Description of the Related Art

Conventionally, there has been a one-way clutch disposed in an automatic transmission.

The one-way clutch is comprised of an inner race, an outer race, and rollers arranged between the inner race and the outer race, for allowing relative rotation of the inner race and the outer race in only one direction.

The outer race and the inner race of the one-way clutch are connected to respective different rotational elements in the automatic transmission, or a rotational element and a transmission case, for controlling the rotational direction of each element.

When the outer race and inner race of the one-way clutch performs relative rotation, and the rollers are guided by the relatively rotating inner race to be forced toward cam peaks formed on an inner circumferential surface of the outer race, the rollers become caught in the form of wedges between the cam peaks of the outer race and the inner race to stop the relative rotation of the inner race and the outer race (hereinafter also referred to as "lock").

On the other hand, when a rotary motion in the direction reverse to the direction in which the inner race and the outer race are locked is imparted to the inner race and the outer race, the rollers caught between the cam peaks of the outer race and the inner race are released to enable relative rotation of the inner race and the outer race.

The structure of such a one-way clutch is described in Japanese Laid-Open Patent Publication (Kokai) No. H02-278061.

The one-way clutch needs to supply lubricating oil to the rollers so as to prevent the rollers from being seized up.

In the case where lubricating oil is supplied from the inner race to the rollers, lubricating oil passages extending in the radial direction cannot be formed from the inner circumferential side of the inner race to the paths of the rollers since another rotational element is connected to the inner circumferential side of the inner race.

Therefore, according to Japanese Laid-Open Patent Publication (Kokai) No. H02-278061, as shown in FIGS. 7A and 7B, a lubricating oil passage 104 is formed from a side of the inner race 100 toward the trace of a roller 102 on an outer circumferential surface of the inner race 100 without passing through a spline tooth 101 which is formed on an inner circumferential surface of the inner race 100 so as to be engaged with a rotational element.

The lubricating oil passage 104 is configured such that particularly as shown in FIG. 7A, a direction 104a in which the lubricating oil passage 104 extends forms a predetermined angle γ' with a perpendicular line 100b orthogonal to a rotational axis 100a of the inner race 100, and particularly as shown in FIG. 7B, a rotational axis 102a of the roller 102 and a direction 104a in which the lubricating oil passage 104 extends coincide with each other as viewed from the outer circumferential side of the inner race 100.

Because of the presence of the lubricating oil passage 104, a part between the lubricating oil passage 104 and the outer circumferential surface of the inner race 100 is a thin-walled part 105 having a smaller wall thickness as compared with other parts.

However, in the roller lubricating structure of the above described one-way clutch, there may be a case where as shown in FIG. 7B, an outer race, not shown, and the inner race 100 are locked in the state in which the roller 102 overlaps an opening of the lubricating oil passage 104 which is formed in the outer circumferential surface of the inner race 100.

In this case, if the inner race 100 is viewed from the direction of the outer circumference thereof, the rotational axis 102a of the roller 102 and the direction 104a in which the lubricating oil passage 104 extends coincide with each other, and hence a wide part of the roller 102 is supported by the thin-walled part 105.

Therefore, when the outer race and the inner race are locked, the thin-walled part 105 is deformed since the roller 102 is pressed against the inner race 100, and as a result, the durability of the one-way clutch is degraded.

SUMMARY OF THE INVENTION

It is therefore an object of the present invention to provide a lubricating structure of a one-way clutch which can lubricate rollers without degrading durability.

To attain the above object, there is provided a lubricating structure of a one-way clutch comprising: an inner race; an outer race; and rollers disposed between the inner race and the outer race; and a lubricating oil passage that is formed in the inner race and has one end opened in a rolling surface on which the rollers roll, for supplying oil from an opening formed at the other end to the one end, wherein the lubricating oil passage is tilted relative to a perpendicular line orthogonal to a rotational axis of the inner race and tilted relative to respective rotational axes of the rollers as viewed from the outer circumferential side of the inner race.

According to the present invention, since the lubricating oil passage that supplies oil to the rollers is tilted relative to the perpendicular line orthogonal to the rotational axis of the inner race and tilted relative to the respective rotational axes of the rollers as viewed from the outer circumferential side of the inner race, a thin-walled part formed between the lubricating oil passage formed just below the roller and the surface on which the rollers roll can be narrowed as compared with the case where the lubricating oil passage is formed in parallel with the respective rotational axes of the rollers as viewed from the outer circumferential side of the inner race. As a result, when the inner race and the outer race are locked, roller's stress is less prone to be concentrated around the thin-walled part, and the deformation of the thin-walled part can be prevented, and therefore the degradation of the one-way clutch's durability can be prevented.

Other features and advantages of the present invention will apparent from the following detailed description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The present invention will now be described in detail with reference to the drawings showing a preferred embodiment thereof.

Figure 1:
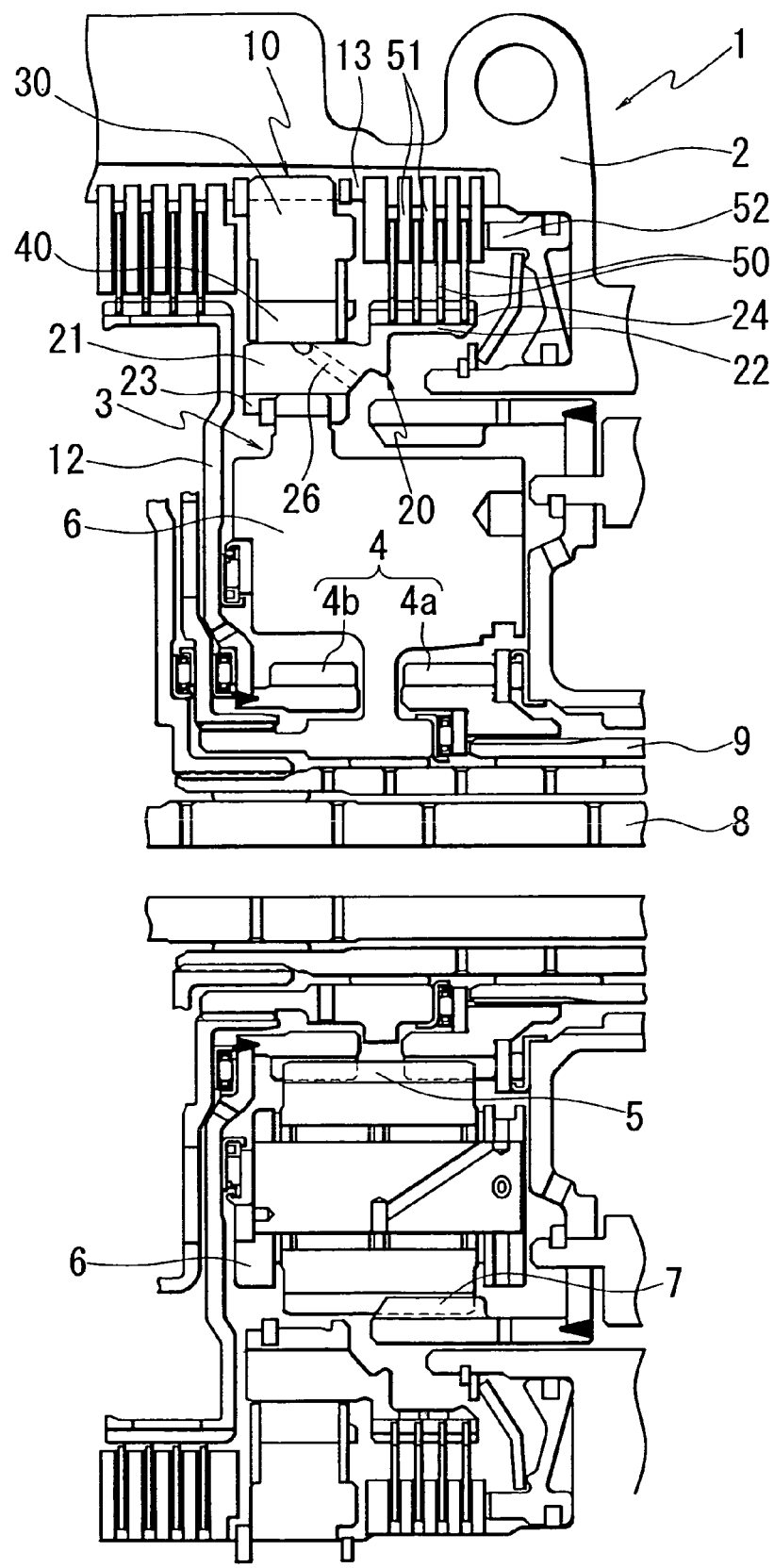
FIG. 1 is a view showing a part of automatic transmission around a one-way clutch according to an embodiment of the present invention.

FIG. 1 is a view showing a one-way clutch of an automatic transmission and its surroundings to which an embodiment of the present invention is applied.

The automatic transmission 1 includes a plurality of planetary gear mechanisms and engaging elements such as clutches and brakes, for carrying out conversion of the rotational speed of driving force input from an engine according to combinations of engagement states of the engagement elements.

A planetary gear mechanism 3 is disposed on the periphery of an input shaft 8 to which driving force is input from an engine.

The planetary gear mechanism 3 is comprised of a first sun gear 4a connected to a rotary shaft 9 disposed on the periphery of the input shaft 8, a second sun gear 4b connected to a drum 12 disposed on the left side of the planetary gear mechanism 3 as viewed in FIG. 1 (the first sun gear 4a and the second sun gear 4b will hereafter be referred to as "the sun gear 4"), a pinion gear 5 engaged with the sun gear 4, a carrier 6 supporting the rotary shaft of the pinion gear 5, and a ring gear 7 which is disposed on the outer circumferential side of the sun gear 4 and the pinion gear 5 and of which teeth formed on the inner circumferential side are engaged with the pinion gear 5.

A one-way clutch 10 is disposed on the outer circumferential side of the planetary gear mechanism 3.

The one-way clutch 10 is comprised mainly of an outer race 30 which is splined to a case spline 13 formed on an inner circumferential surface of a transmission case 2, an inner race 20 disposed on the inner side of the outer race 30, and rollers 40 arranged between the outer race 30 and the inner race 20.

The inner race 20 is comprised of a cylindrical roller supporting section 21 having gear teeth formed on an inner circumferential surface thereof, and a cylindrical friction plate supporting section 22 having a supporting section spline 24 formed on an outer circumferential surface thereof.

The roller supporting section 21 supports the rollers 40 on an outer circumferential surface thereof.

The friction plate supporting section 22 has a larger diameter as compared with the roller supporting section 21.

Teeth formed on an outer circumferential surface of the carrier 6 of the planetary gear mechanism 3 are integrally engaged with teeth 23 of the roller supporting section 21.

Friction plates 50, of which teeth to be engaged with the supporting section spline 24 are formed on the inner circumferential side, are engaged with the supporting section spline 24 of the friction plate supporting section 22.

Friction plates 51, of which teeth to be engaged with the case spline 13 are formed on the outer circumferential side, are engaged with the case spline 13 of the transmission case 2.

The friction plates 50 and the friction plates 51 are alternately laid one upon the other. When a piston 52 urges them, they are engaged with each other, so that the transmission case 2 and the inner race 20 are combined into an integral unit.

Next, a detailed description will be given of the one-way clutch 10.

Figure 2A:
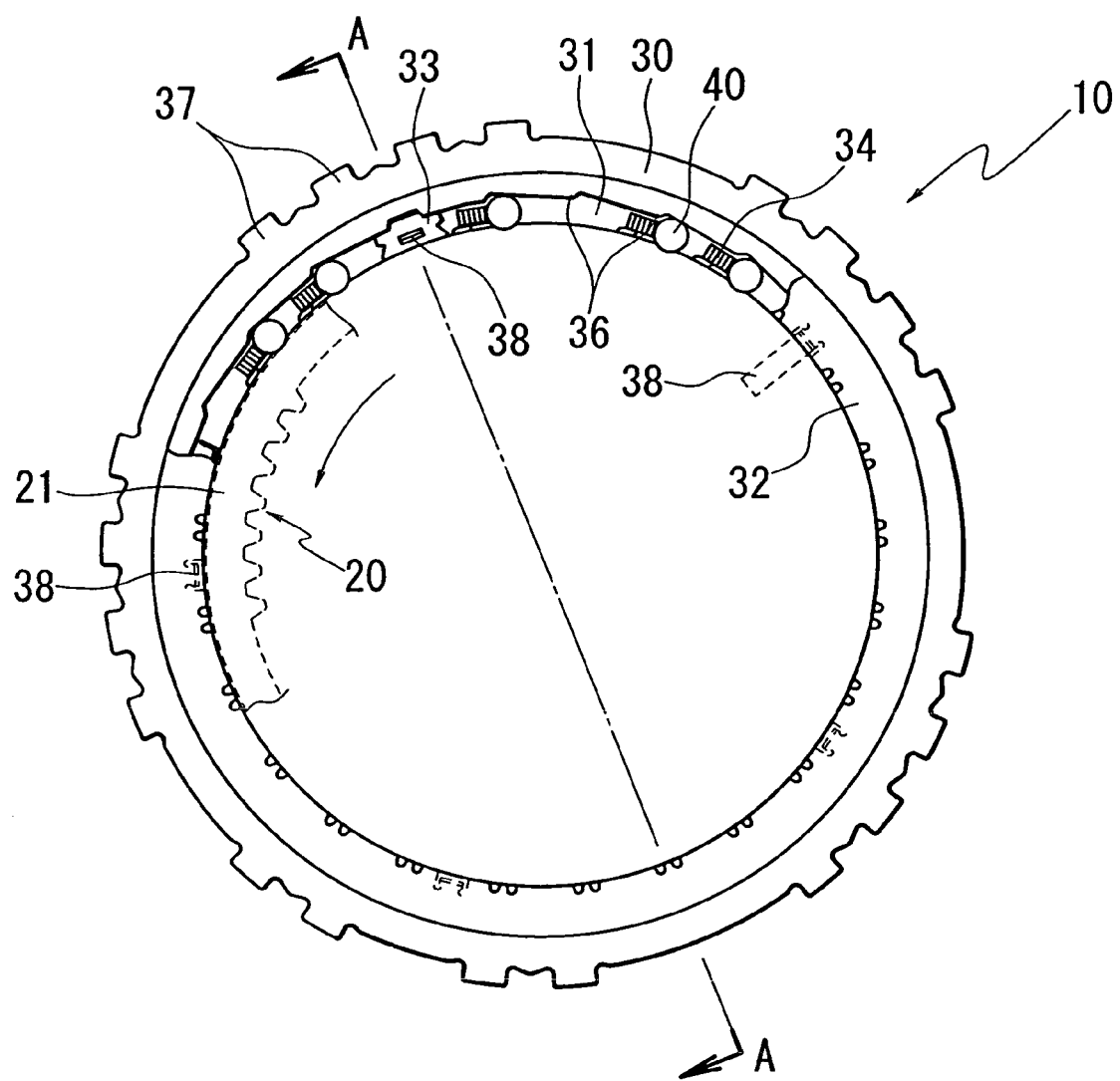
FIGS. 2A and 2B are views showing the one-way clutch.
Figure 2B:
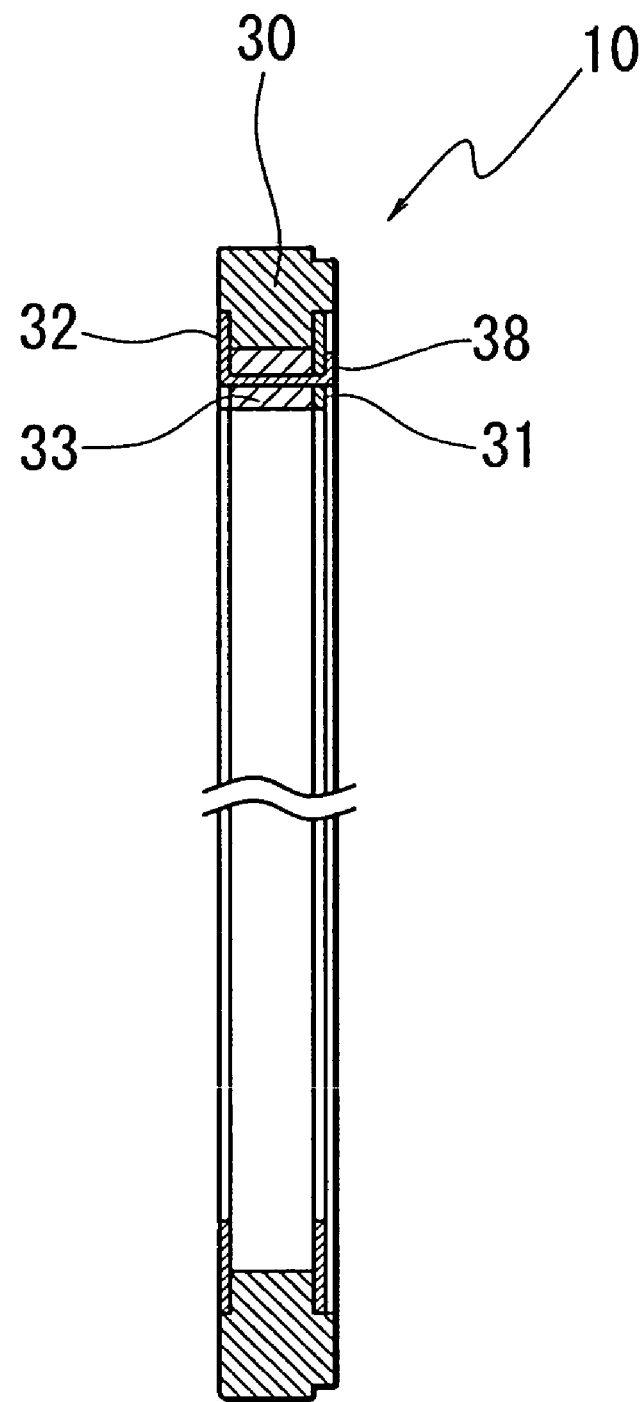

FIG. 2A is a front view showing the one-way clutch 10, and FIG. 2B is an enlarged sectional view taken along line A-A of FIG. 2A.

It should be noted that in FIG. 2A, a cage 32 is partially broken so as to illustrate the rollers 40.

Teeth 37 to be engaged with the case spline 13 of the transmission case 2 are formed at predetermined positions of an outer circumferential surface of the outer race 30.

A plurality of cam peaks 36 are formed on an inner circumferential surface of the outer race 30 particularly as shown in FIG. 2A.

Block bearings 33 are mounted on the inner circumferential surface of the outer race 30. Surfaces of the block bearings 33 on the inner diameter side thereof are slidably in contact with the outer circumferential surface of the inner race 20.

The block bearings 33 rotatably support the outer circumferential surface of the inner race 20 on the outer race 30.

A disc-shaped cage 32 and a side plate 31, which cover the gaps between the inner race 20 and the outer case 30 and the cam peaks 36, are arranged on the front side and backside, respectively, of the outer race 30.

The rollers 40 are arranged in valleys of the cam peaks 36 and forced toward the tops of the cam peaks 36 by springs 34 fixed to the cage 32.

It should be noted that the rollers 40 are forced by the springs 34 in the same direction.

As indicated by broken lines in FIG. 2A, holding claws 38 extending to the inner-diameter side are formed on the cage 32. As shown in FIG. 2B, the holding claws 38 are bent toward the side plate 31 and passed through holes formed in the side plate 31, and ends of the holding claws 38 are bent toward the outer-diameter side to hold the side plate 31.

When the holding claws 38 are bent toward the side plate 31, they are passed through respective through-holes formed in the block bearings 33 so that the cage 32 is fixed to the outer race 30.

The inner race 20 disposed on the inner-diameter side of the outer race 30 is rotatable leftward as viewed in FIG. 2A. When the inner race 20 is trying to rotate rightward, the rollers 40 strand the cam peaks 36, and the outer circumferential surface of the inner race 20 is urged by the rollers 40, so that the relative rotation of the outer race 30 and the inner race 20 is inhibited.

When the relative rotation-inhibited state and rotatable state of the inner race 20 are switched to each other, the rollers 40 revolve around the rotary shaft 20a of the inner race 20, and when the inner race 20 lies in the rotatable state, the rollers 40 rotate on their rotational axes 40a. (see FIG. 3A, 3B)

Next, a detailed description will be given of the inner race 20.

Figure 3A:
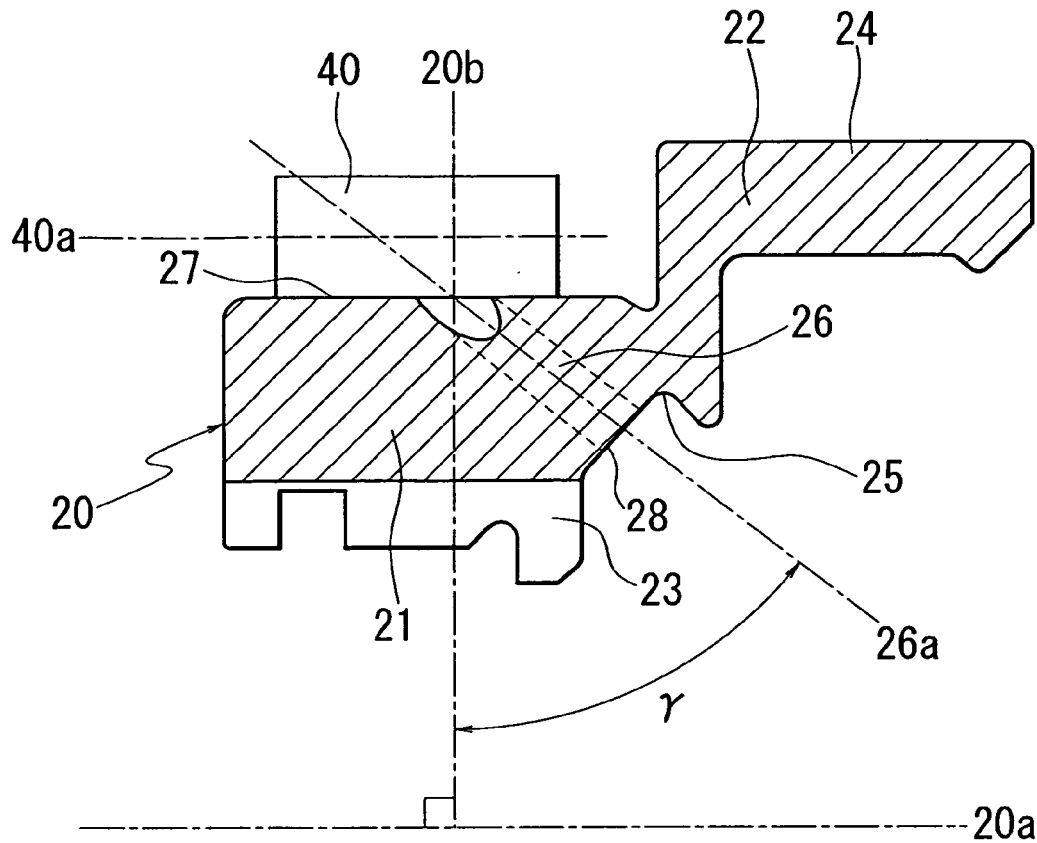
FIGS. 3A and 3B are views showing a lubricating oil passage formed in an inner race.
Figure 3B:
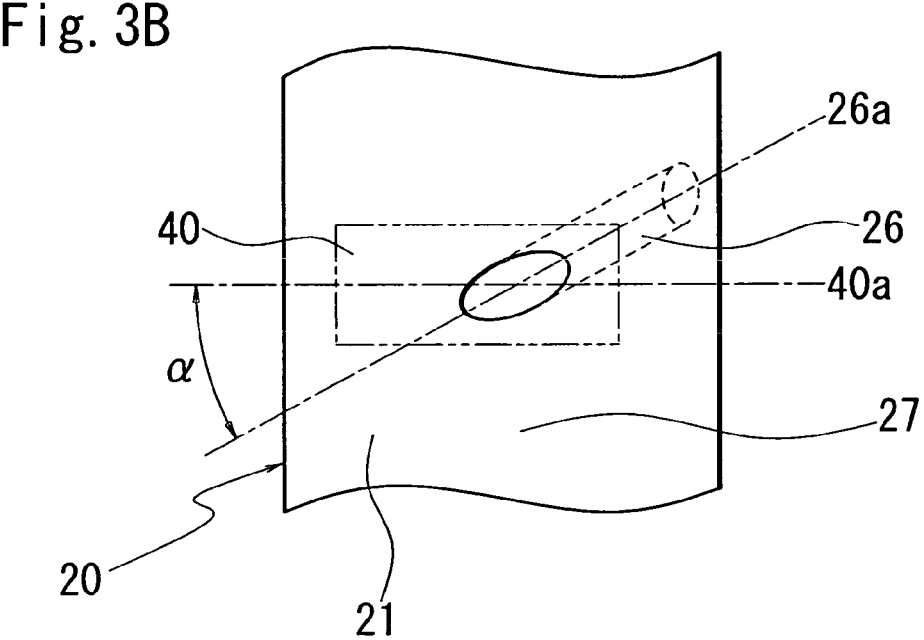

FIG. 3A is a sectional view showing the inner race 20, and FIG. 3B is a view showing the outer circumferential surface of the roller supporting section 21, and more particularly an opening of a lubricating oil passage 26 and its surroundings.

The inner race 20 is comprised of the roller supporting section 21, and the friction plate supporting section 22 extending from the outer circumferential surface of an end of the roller supporting section 21.

The lubricating oil passage 26 is formed to extend from a side wall of the roller supporting section 21 onto the path of the rollers 40 on the outer circumferential surface of the roller supporting section 21 (hereinafter referred to as a roller rolling surface 27).

Thus, a direction 26a in which the lubricating oil passage 26 extends forms a predetermined angle γ with a perpendicular line 20b orthogonal to the rotational axis 20a of the inner race 20.

A side wall of the roller supporting section 21 in which the lubricating oil passage 26 is opened (hereinafter referred to as "the opening surface 28") is substantially orthogonal to the direction 26a in which the lubricating oil passage 26 extends.

A groove-shaped oil receiver 25 facing the inner diameter of the inner race 20 is formed in the vicinity of the opening of the lubricating oil passage 26 in the opening surface 28.

The lubricating oil passage 26 is formed such that as shown in FIG. 3B, the direction 26a in which the lubricating oil passage 26 extends forms a predetermined angle α with the respective rotational axes 40a of the rollers 40 as viewed from the outer circumferential of the inner race 20.

Oil supplied from a control valve, not shown, to the planetary gear mechanism 3 and other rotational elements drops to the bottom of the automatic transmission and/or spatters to the surroundings by centrifugal force.

The oil is received by the oil receiver 25 and supplied to the roller rolling surface 27 of the inner race 20 via the lubricating oil passage 26 to lubricate the rollers 40.

Figure 4:
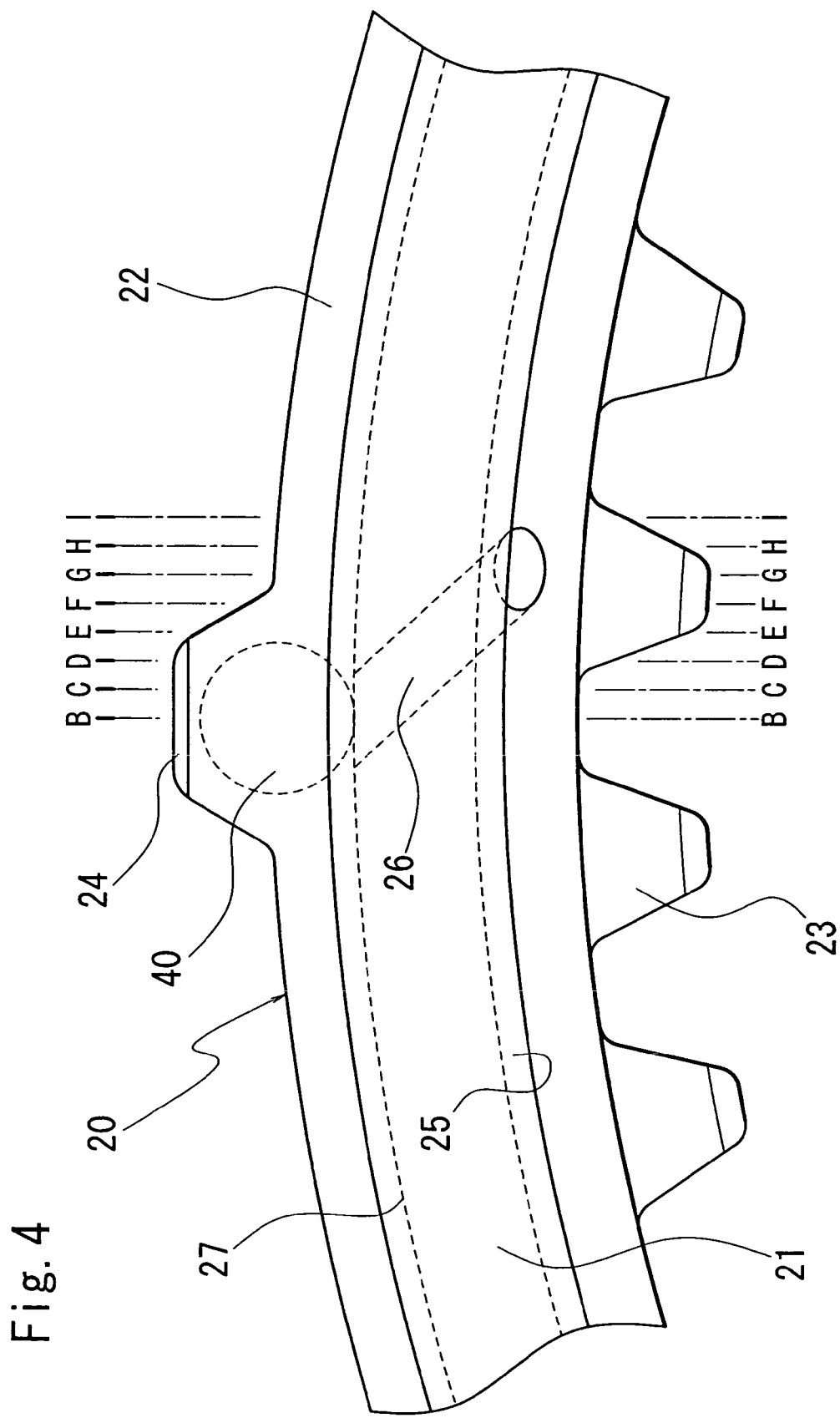
FIG. 4 is a side view of the inner race.

FIG. 4 is a side view showing the inner race 20, and FIGS. 5A to 5H are sectional views taken along lines B-B to I-I of FIG. 4.

Figure 5A:
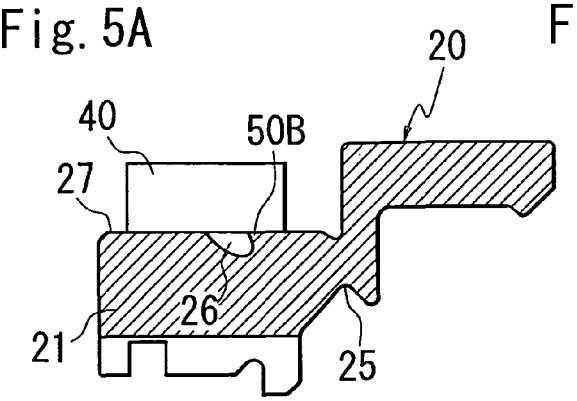
FIGS. 5A to 5H are sectional views taken along lines B-B to I-I, respectively, of FIG. 4.
Figure 5E:
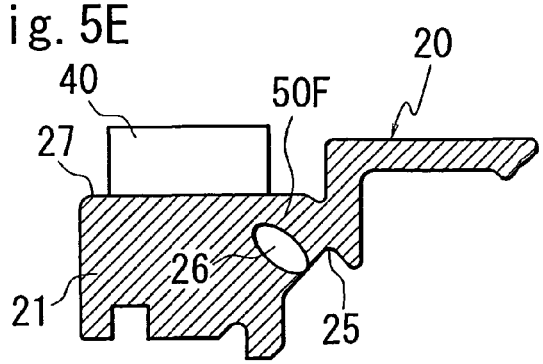
Figure 5B:
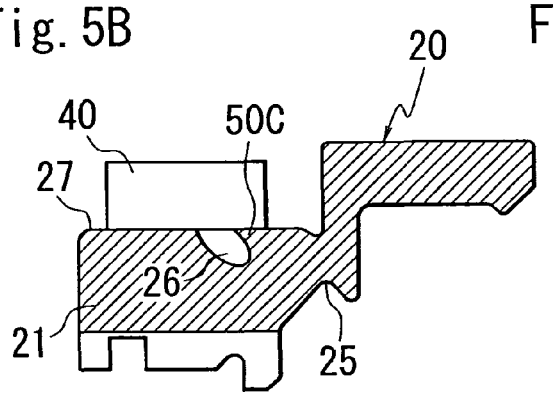
Figure 5F:
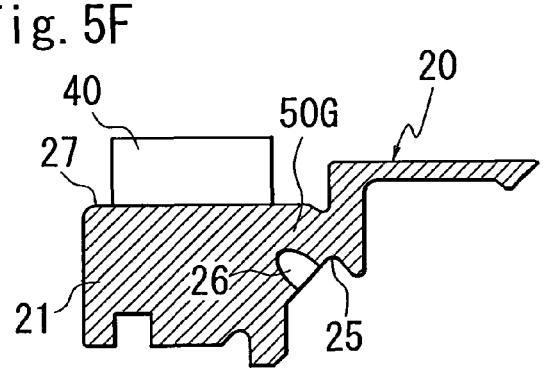
Figure 5C:
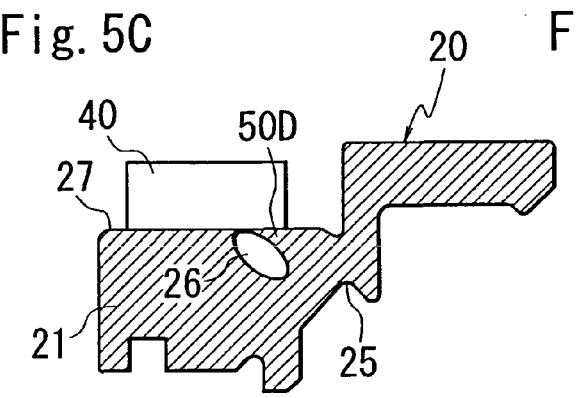
Figure 5G:
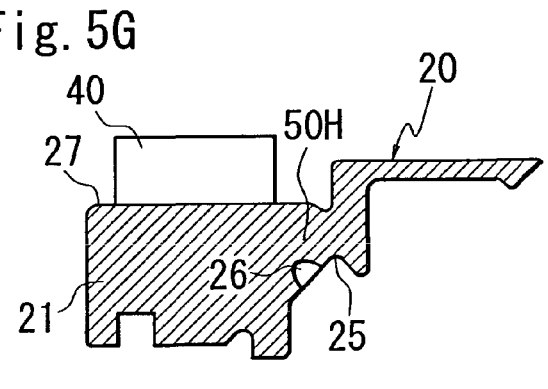
Figure 5D:
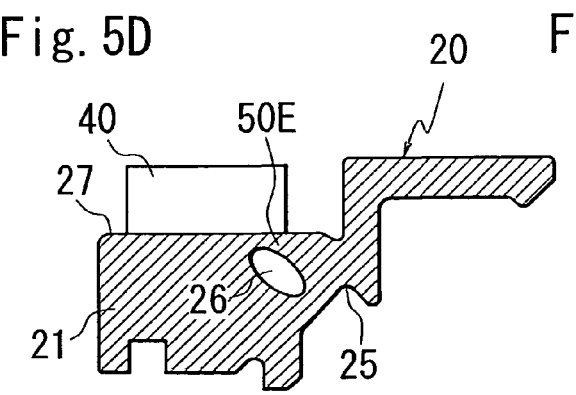
Figure 5H:
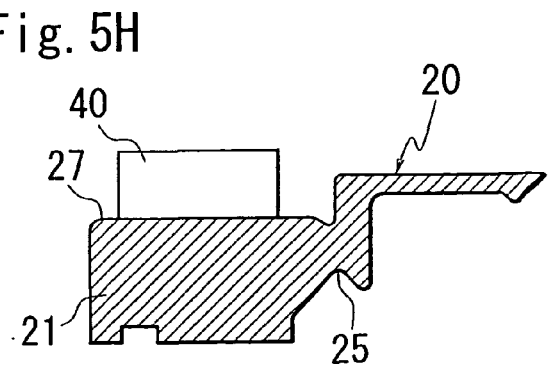

As shown in FIG. 5A which is a sectional view taken along line B-B of FIG. 4, a part between an upper edge of a cross section of the lubricating oil passage 26 and the roller rolling surface 27 is a thin-walled part 50B having a smaller wall thickness as compared with other parts of the roller supporting section 21.

Similarly in FIGS. 5B to 5G, parts between the upper edge of the cross section of the lubricating oil passage 26 and the roller rolling surface 27 are thin-walled parts 50C to 50H.

If the roller 40 stops on any of Section B-B to Section H-H appearing in FIG. 4 when the inner race 20 and the outer race 30 are locked, the roller 40 is supported by any of the thin-walled parts 50B to 50H of the roller supporting section 21 and the thick-walled part.

As described above, according to the present embodiment, the lubricating oil passage 26 that supplies oil to the rollers 40 is formed such that as shown in FIG. 3A, the direction 26a in which the lubricating oil passage 26 extends forms a predetermined angle γ with the perpendicular line 20b orthogonal to the rotational axis 20a of the inner race 20, and as shown in FIG. 3B, the direction 26a in which the lubricating oil passage 26 extends forms a predetermined angle α with the respective rotational axes 40a of the rollers 40 as viewed from the outer circumferential side of the inner race 20.

Figure 7A:
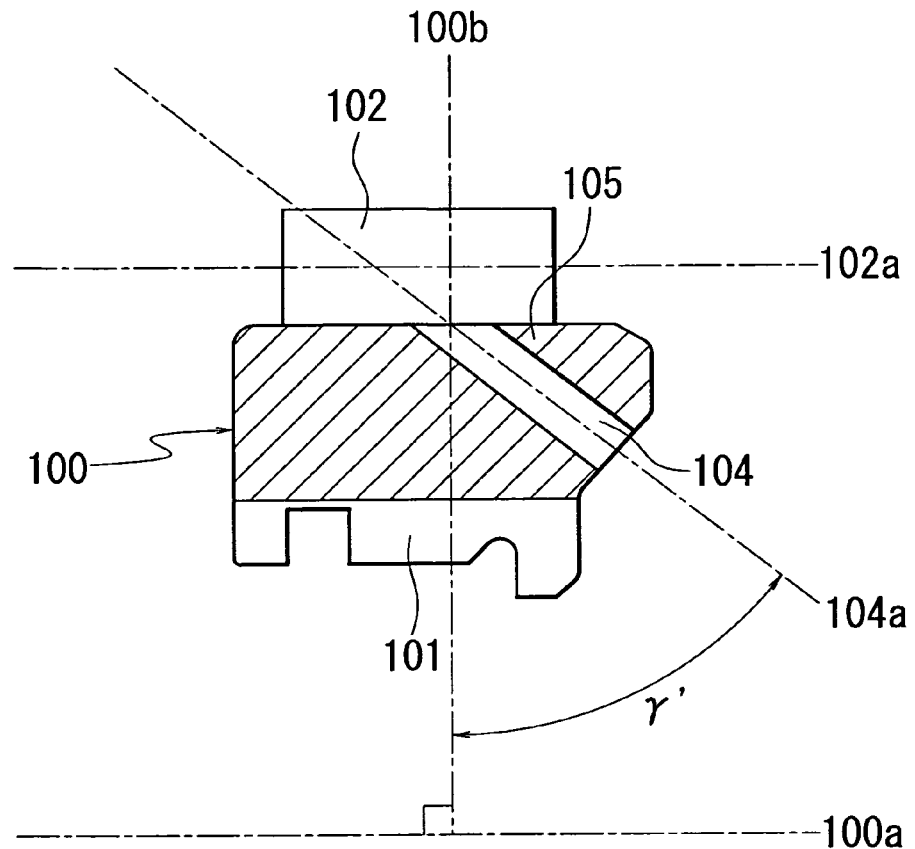
FIG. 7 is a view showing a lubricating oil passage formed in an inner race according to a prior art.
Figure 7B:
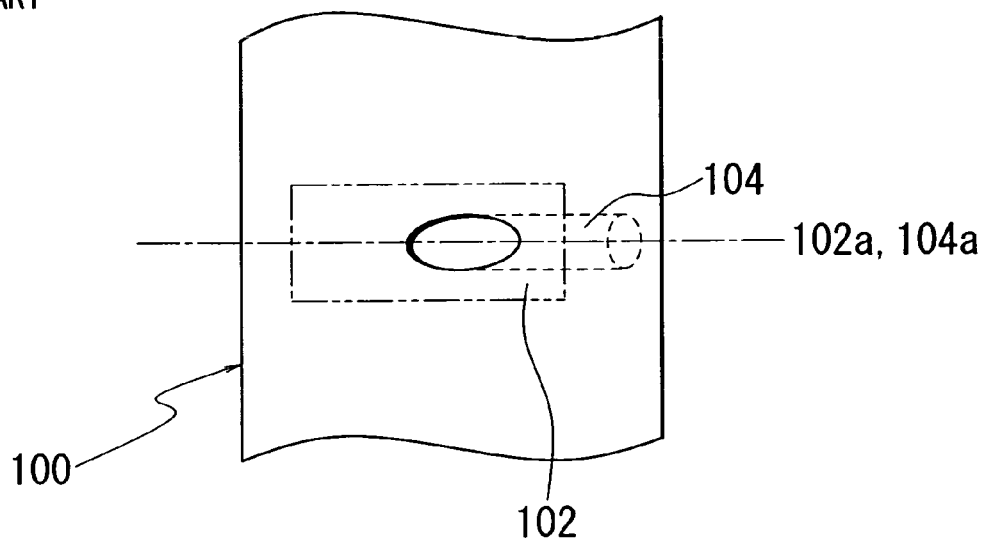

With this arrangement, as compared with the prior art that the rotational axis 102a of the roller 102 and the direction 104a in which the lubricating oil passage 104 extends coincide with each other as viewed from the outer circumferential side of the inner race 100 as shown in FIGS. 7A and 7B, and that the respective rotational axes 40a of the rollers 40 and the direction 26a in which the lubricating oil passage 26 extends do not intersect each other at a predetermined angle α as distinct from the present embodiment, each of the thin-walled parts 50B to 50H formed just below the roller 40 can be reduced in size when the roller 40 stops on the lubricating oil passage 26.

Thus, the wide part of the roller 40 can be supported by the thick-walled part of the inner race 20, and when the inner race 20 and the outer race 30 are locked, stress from the roller 40 is less prone to concentrate around the thin-walled parts 50B to 50H. As a result, it is possible to prevent deformation of the thin-walled parts 50B to 50H and degradation of the durability of the one-way clutch 10.

Since the oil receiver 25 is formed in the vicinity of the opening of the lubricating oil passage 26 in the side of the roller supporting section 21, for receiving oil spattered from the planetary gear mechanism 3 and supplying the oil to the lubricating oil passage 26, it is possible to supply oil to the lubricating oil passage 26 and lubricate the rollers 40 by a simple arrangement.

Also, since the opening surface 28 and the lubricating oil passage 26 are substantially orthogonal to each other, the opening surface 28 is substantially orthogonal to a direction in which the lubricating oil passage 26 tilted relative to the perpendicular line 20b of the rotational axis 20a of the inner race 20 is machined using a drill, it is possible to prevent a tooth of the drill from coming out or being broken. As a result, machinability can be improved.

Next, a description will be given of a variation of the lubricating oil passage.

Figure 6A:
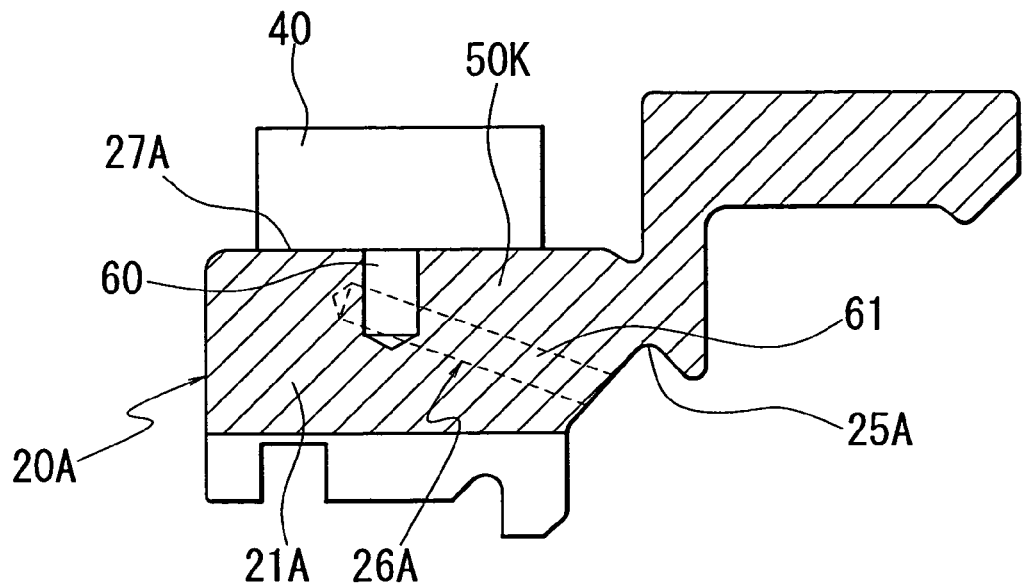
FIG. 6 is a view showing a lubricating oil passage according to a variation.
Figure 6B:
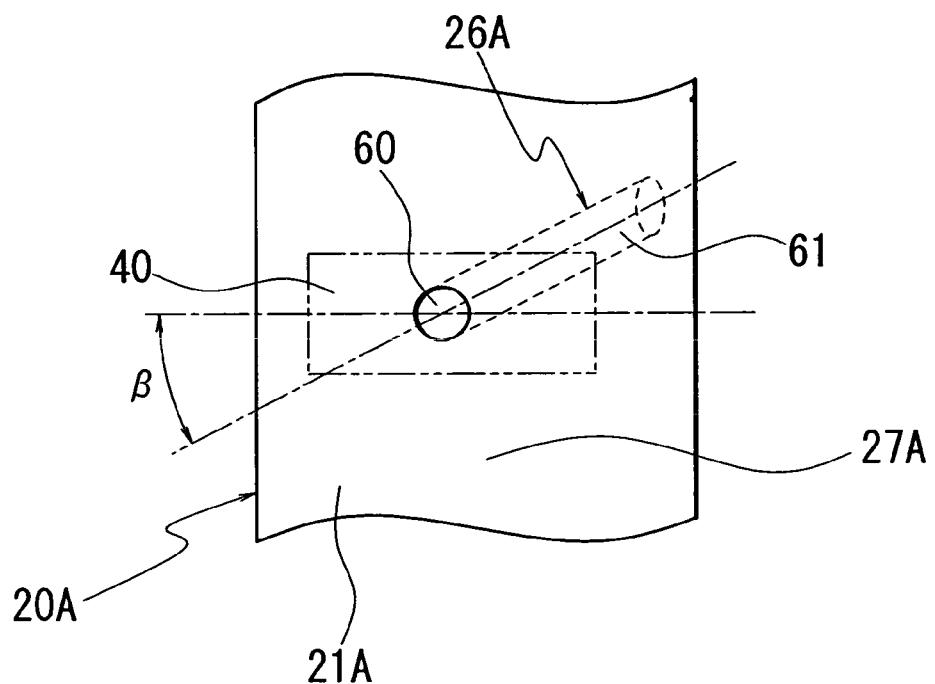

FIGS. 6A and 6B show a lubricating oil passage 26A according to the variation.

A first oil passage 60 with a predetermined depth in the radial direction is formed to extend from a roller rolling surface 27A of an inner race 20A.

A second oil passage 61 tilted relative to a perpendicular line orthogonal to the rotational axis of the inner race 20A and tilted relative to the respective rotational axes of the rollers 40 as viewed from the outer circumferential side of the inner race 20A is formed to extend from a side of a roller supporting section 21A to the first oil passage 60.

And the second oil passage 61 forms a predetermined angle β with the respective rotational axes of the rollers 40 as viewed from the outer circumferential side of the inner race 20A.

A groove-shaped oil receiver 25A of which opening faces the inner diameter of the inner race 20A is formed in the vicinity of an opening of the lubricating oil passage 26A in the side of the roller supporting section 21A.

The first oil passage 60 and the second oil passage 61 constitute the lubricating oil passage 26A; oil received by the oil receiver 25A can be supplied to the rollers 40 via the lubricating oil passage 26A.

As is the case with the above described embodiment, according to the variation, since the direction of the respective rotational axes of the rollers 40 and the second oil passage 61 of the lubricating oil passage 26A are tilted as viewed from the outer circumferential side of the inner race 20A, a thin-walled part 50K formed between the second oil passage 61 and the roller rolling surface 27A can be reduced in size. As a result, it is possible to prevent deformation of the thin-walled part 50K and degradation of one-way clutch's durability.

What is claimed is:

1. A lubricating structure of a one-way clutch comprising:
an inner race;
an outer race;
a plurality of rollers disposed between said inner race and said outer race, each roller of said plurality of rollers having a respective rotational axis; and
a lubricating oil passage, formed in said inner race in a substantially straight line, including a first end opened in a rolling surface on which said rollers roll and a second end that opens in a side wall of the inner race;
wherein said lubricating oil passage is tilted relative to a perpendicular line orthogonal to a rotational axis of said inner race and tilted relative to the respective rotational axes of said plurality of rollers as viewed from an outer circumferential side of said inner race, such that a centerline of the lubricating oil passage intersects a plane containing both the perpendicular line orthogonal to the rotational axis of the inner race and the rotational axis of the inner race at a single point; and
wherein a groove-shaped oil receiver facing an inner-diameter side of said inner race is provided in a vicinity of the second end of said lubricating oil passage.

* * * * *